H. L. LORD.
LAWN SPRINKLER.
APPLICATION FILED FEB. 10, 1914.
1,142,448.
Patented June 8, 1915.
2 SHEETS—SHEET 1.
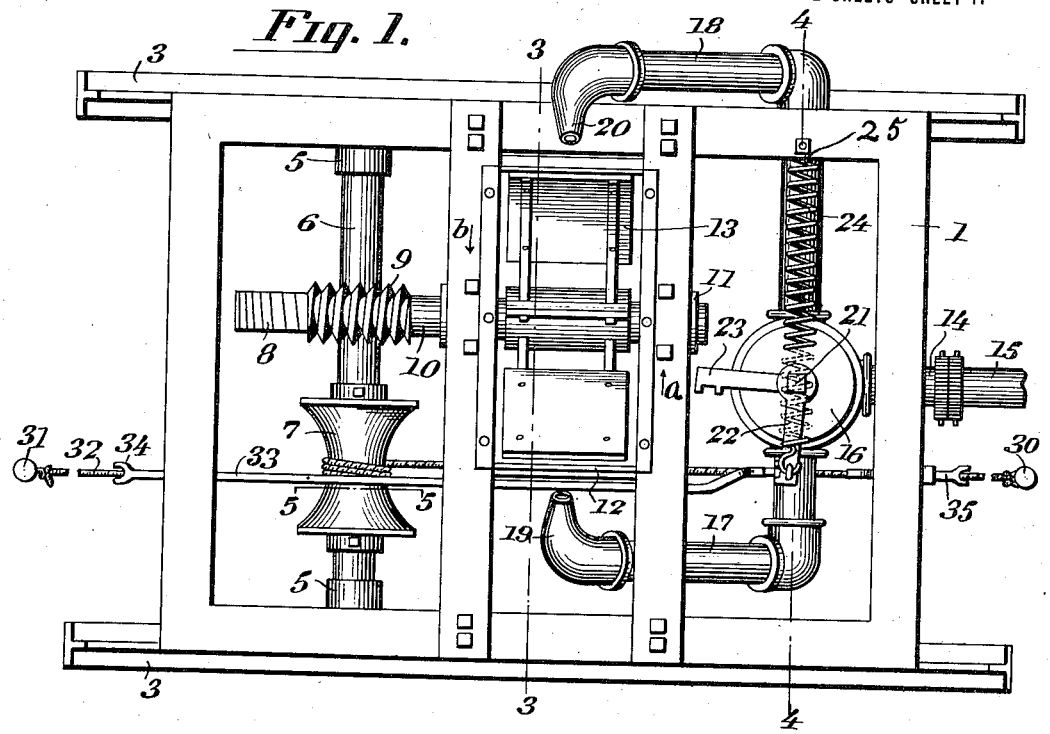
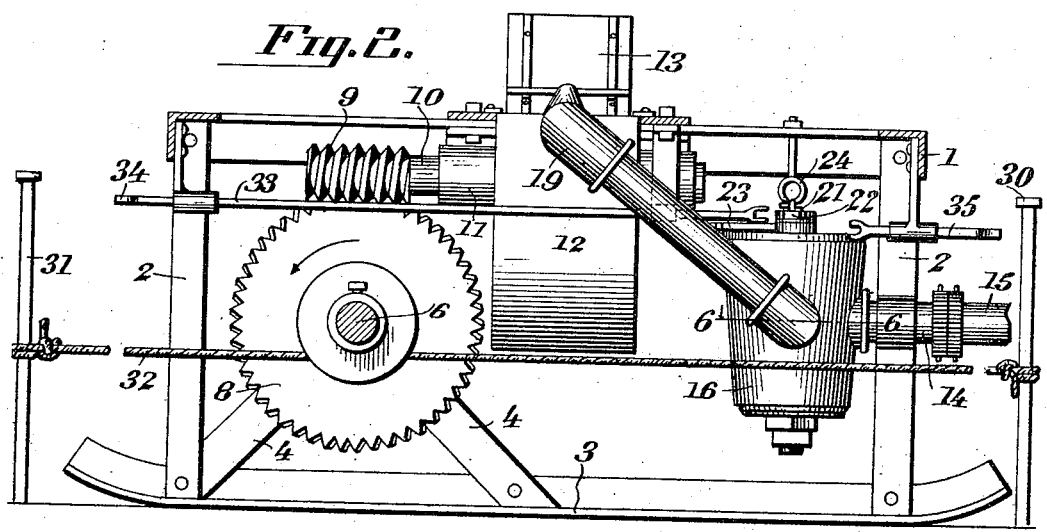
Witnesses
Inventor
H. L. Lord
By Victor J. Evans
Attorney

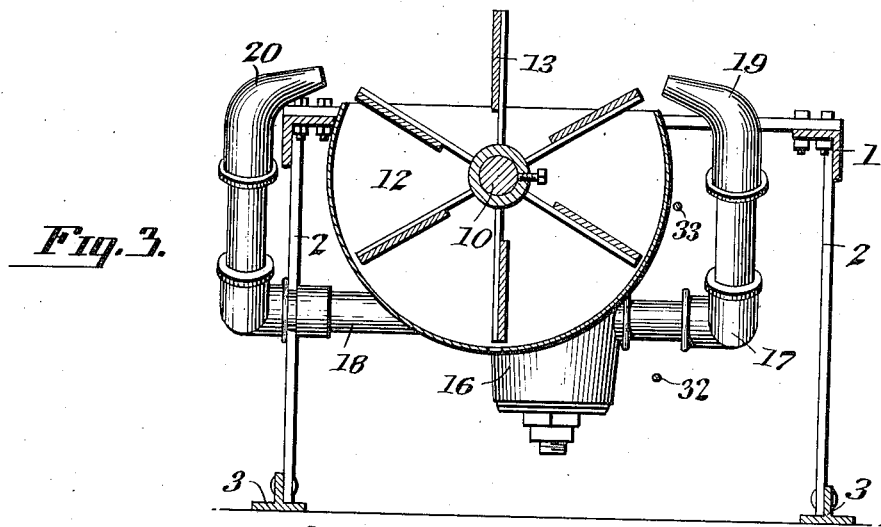
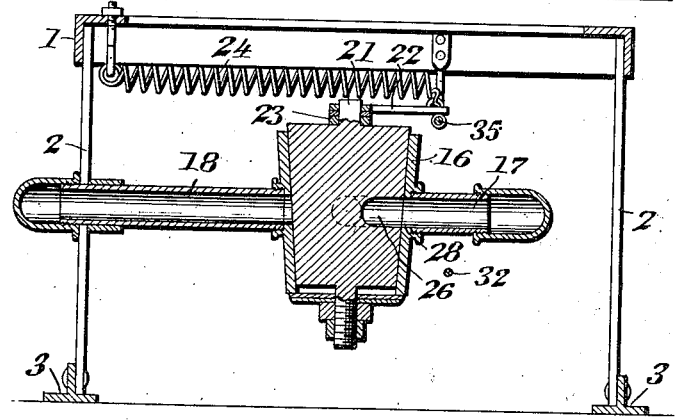
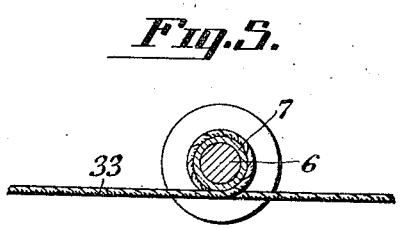
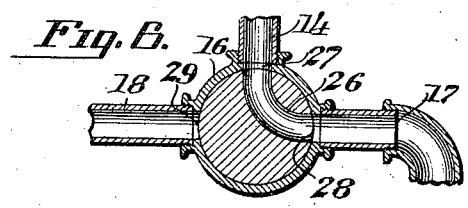

UNITED STATES PATENT OFFICE.

HENRY L. LORD, OF KANOPOLIS, KANSAS.

LAWN-SPRINKLER.

1,142,448.  Specification of Letters Patent.  Patented June 8, 1915.

Application filed February 10, 1914. Serial No. 817,902.

*To all whom it may concern:*

Be it known that I, HENRY L. LORD, a citizen of the United States, residing at Kanopolis, in the county of Ellsworth and State of Kansas, have invented new and useful Improvements in Lawn-Sprinklers, of which the following is a specification.

This invention relates to lawn sprinklers and more particularly to traveling sprinklers.

The particular object of the invention is to provide a simple and efficient device of this character which will be automatically propelled by the water utilized in spraying the lawn and will move evenly and uninterruptedly so that all parts of the lawn will receive an equal amount of water.

Another object of the invention is the provision of a device of this character which will be automatically propelled from one point to another, automatically reversed and propelled in a retrograde direction to the starting point where it will be automatically stopped and the water cut off so that it can be removed to another position.

Further objects of the invention will appear as the following description is read in connection with the accompanying drawing, which forms a part of this application, and in which:—

Figure 1 is a top plan view. Fig. 2 is a side elevation. Fig. 3 is a sectional view taken on the line 3—3 of Fig. 1. Fig. 4 is a similar view on the line 4—4 of Fig. 1. Fig. 5 is a longitudinal sectional view taken on the line 5—5 of Fig. 1. Fig. 6 is a detail horizontal sectional view taken on the line 6—6 of Fig. 2.

Referring more particularly to the drawing, 1 represents a substantially rectangular frame which may be constructed of any suitable material and has depending therefrom supporting legs 2 preferably arranged at each corner and connected at their lower ends to the supporting runners 3 arranged upon opposite sides of the device.

Mounted upon the runners and extended above the same are diagonally arranged braces 4 which support bearings 5 in which a shaft 6 is journaled. This shaft has keyed thereto a drum 7 and a worm wheel 8, the latter having meshing therewith a worm 9 carried upon a longitudinally disposed shaft 10 which is in turn journaled in bearings 11.

Keyed to the shaft 10 intermediate the bearings and arranged within a casing 12 open at its upper end, is a fan or propeller wheel 13 which is operated by the water used in spraying the lawn, as will be hereinafter described.

Connected to the frame is a suitable union 14 to which is connected the supply hose 15, only a short length of which is shown. The opposite end of the union is coupled directly with the casing of a three-way valve 16 arranged to connect the casing with discharge pipes 17 and 18 extending from opposite sides thereof. The discharge pipe 17 terminates in a discharge nozzle 19 while the pipe 18 terminates in a discharge nozzle 20. These nozzles 19 and 20 discharge the water against the fan or propeller blades in opposite directions and when water is running through the pipe 17, we will say, the shaft 10 will be rotated in the direction of the arrow *a*, while when water is passing through the pipe 18 the shaft will be rotated in the direction of the arrow *b*.

Connected to the valve is a squared stem 21 which carries operating levers 22 and 23, the latter being arranged above the former and the former having connected to its outer end one end of a spiral spring 24, the opposite end of which is connected, as shown at 25, to the frame 1.

When the valve 16 has its port 26 communicating with the port 27 and the port 28 in the casing the lever 22 will be positioned immediately over the lateral extension of the pipe 17 and in line with the pull of the spring and when this lever is moved past its dead center in a rearward direction, as will be hereinafter described, the spring will then act to cause the port 26 to communicate with the ports 27 and the port 29. In the first instance it will be seen that water passing through the ports 27, 26 and 28 will pass directly to the pipe 17 and the water discharged therefrom will rotate the shaft 10 in the direction of the arrow *a*, while when the port 26 is in communication with the ports 27 and 29 water will pass through the pipe 18 and impinge upon the fan blades in the opposite direction and cause the rotation of the shaft 10 in the direction of the arrow *b*.

In order to produce proper travel of the sprinkler from its starting point to the terminal of its route and return again stakes 30 and 31 are driven and have connected thereto a cable 32 which has several turns taken around the drum 7 so that when the shaft 10 is rotated in either direction the drum will be rotated accordingly and operating upon the cable 7 will propel the vehicle in a straight line guided by the cable.

In order to cause a retrograde movement of the device after traveling the course from the start to the terminus of its movement there is slidably mounted in the frame a shifting rod 33 which is provided with a forked forward end 34 arranged to engage the stake 31. The rear end of the rod 33 is arranged in the path of the lever 22 so that when the rod 33 engages the stake it will be moved rearwardly over the frame and will actuate the lever 22 to carry it beyond the dead center when the spring 24 will act to rapidly turn the valve 16 in its casing, thereby reversing the direction of flow of the water against the wheel 13.

When the machine has reached its full retrograde movement the stake will engage a tripping rod 35 which is arranged directly above the cable and is slidably mounted within the frame in a similar manner to the rod 33. This rod when brought into engagement with the stake will move forwardly and engage the lever 23 so as to shift the valve one-eighth of a revolution, whereby the port 26 will be out of register with the port 27. Thus it will be seen that no water can enter either of the pipes 17 or 18 and the machine will be stopped until set for further operation in a different path of travel. It will be noticed that when the machine is traveling forward or toward the stake 31 the water will be sprayed to the right when looking toward the stake 31 and when the machine starts in its retrograde movement water will be sprayed to the left when looking toward the stake 31; in other words, when traveling in one direction the machine will spray water upon one side thereof and when traveling in the opposite direction will spray water upon the adjoining path on the opposite side thereof, the water being sprayed in both instances by its contact with the blades of the propeller wheel.

What is claimed is:—

In a lawn sprinkler, a staked cable, a frame, a drum rotatably mounted in the frame and coacting with the cable to drive the frame in either direction, a spraying wheel operatively connected to drive the drum, a source of water supply connected to the frame, means for directing the water against one side of the wheel, means automatically actuated when the frame reaches one terminal of the cable for causing a reversal of the direction of flow of the water whereby it impinges against the opposite side of the wheel, and means for cutting off the water to the wheel when the frame reaches the opposite terminal of the cable.

In testimony whereof I affix my signature in presence of two witnesses.

HENRY L. LORD.

Witnesses:
  A. H. SCHUMACHER,
  C. E. SCHUMACHER.